(12) United States Patent
Podgurski (10) Patent No.: US 7,524,169 B2
(45) Date of Patent: Apr. 28, 2009

(54) HELICOPTER PITCH LINK WITH ACCESSIBLE ADJUSTMENT FEATURES

(75) Inventor: Daniel M. Podgurski, West Chester, PA (US)

(73) Assignee: The Boeing Company, Chicago, IL (US)

( * ) Notice: Subject to any disclaimer, the term of this patent is extended or adjusted under 35 U.S.C. 154(b) by 452 days.

(21) Appl. No.: 11/332,961

(22) Filed: Jan. 17, 2006

(65) Prior Publication Data

US 2007/0166162 A1    Jul. 19, 2007

(51) Int. Cl.
*B64C 27/37*    (2006.01)
*B64C 11/32*    (2006.01)

(52) U.S. Cl. .................................. 416/168 R
(58) Field of Classification Search .................... 416/25, 416/26, 98, 130, 104, 168 R, 247 R
See application file for complete search history.

(56) References Cited

U.S. PATENT DOCUMENTS

| | | | | |
|---|---|---|---|---|
| 3,736,010 A | * | 5/1973 | Larkin | ......................... 403/104 |
| 3,786,695 A | * | 1/1974 | Barrett, Jr. | .................... 74/586 |
| 4,053,123 A | * | 10/1977 | Chadwick | ................. 244/17.11 |
| 5,026,254 A | * | 6/1991 | Ford et al. | ...................... 416/61 |
| 5,203,522 A | * | 4/1993 | White et al. | .............. 244/17.11 |
| 5,431,540 A | * | 7/1995 | Doolin et al. | ............ 416/168 R |
| 5,946,981 A | * | 9/1999 | Ide et al. | .................... 74/579 R |

* cited by examiner

*Primary Examiner*—Edward Look
*Assistant Examiner*—Nathaniel Wiehe
(74) *Attorney, Agent, or Firm*—Hope Baldauff Hartman, LLC (57) ABSTRACT

A helicopter pitch link assembly as described herein includes a length adjustment mechanism, such as a turnbuckle, that is accessible when the pitch link assembly is installed on a helicopter that utilizes a weather cover or canopy and a protective boot. The adjustment mechanism extends above the canopy and the protective boot, even when the rotor blades are in a neutral pitch position. This enables quick and easy access to the adjustment mechanisms while eliminating the need to support the rotor blades, which might otherwise be necessary to alleviate stress on the rotor blade hinge points and pitch link assembly.

24 Claims, 7 Drawing Sheets

HELICOPTER PITCH LINK WITH ACCESSIBLE ADJUSTMENT FEATURES

TECHNICAL FIELD

The present invention relates generally to helicopter control apparatus. More particularly, the present invention relates to a helicopter blade pitch link assembly.

BACKGROUND

Figure 1:
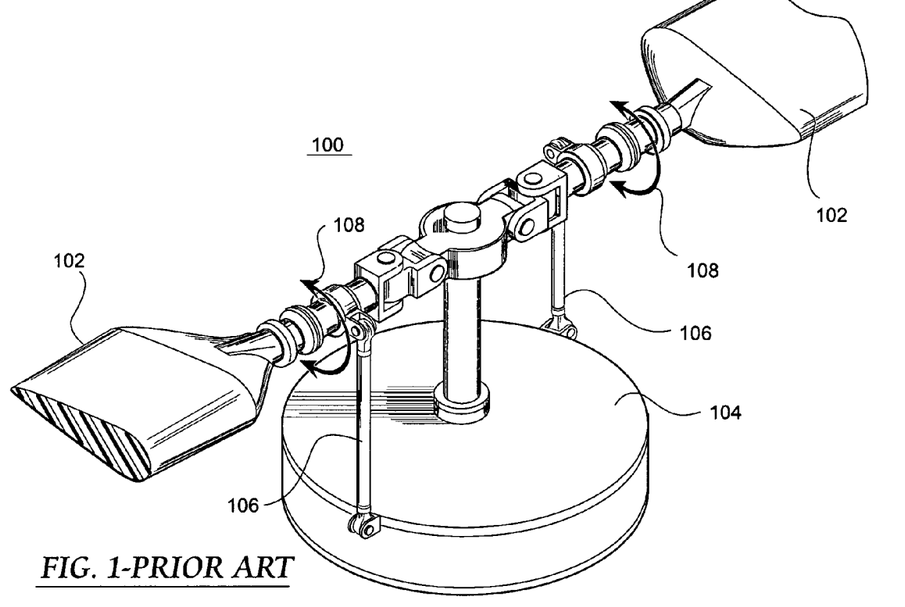
FIG. 1 is a perspective view of a portion of a prior art helicopter.

The prior art is replete with helicopter designs and flight control systems for helicopters. A helicopter employs rotating blades that generate upward thrust that lifts the helicopter above the ground. FIG. 1 is a perspective view of a section of a helicopter 100, including two blades 102, an upper control mechanism 104, and two pitch link assemblies 106. In operation, upper control mechanism 104 (which rotates along with blades 102) actuates pitch link assemblies 106 to adjust the pitch of blades 102. In this regard, upper control mechanism 104 generally raises or lowers pitch link assemblies 106 to cause blades 102 to rotate about their respective longitudinal axes. The arrows 108 in FIG. 1 indicate the rotation of blades 102 about their longitudinal axes.

Figure 2:
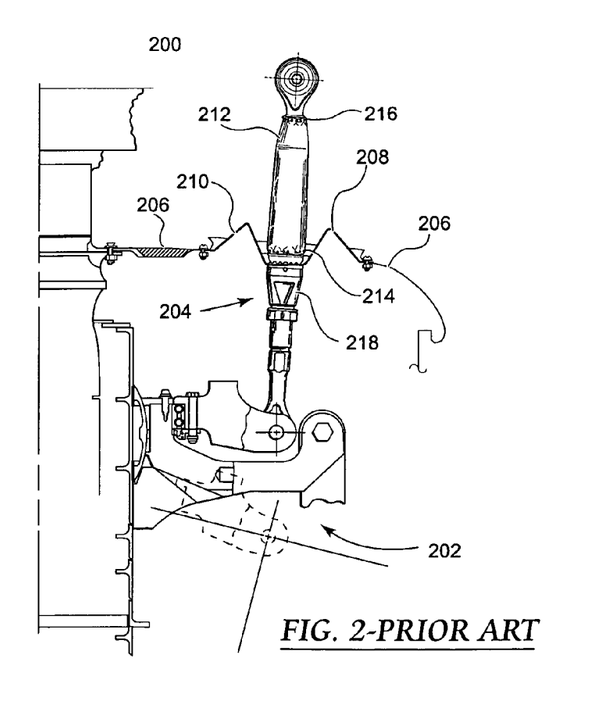
FIG. 2 is a partial cross sectional view of a portion of a prior art helicopter.
Figure 3:
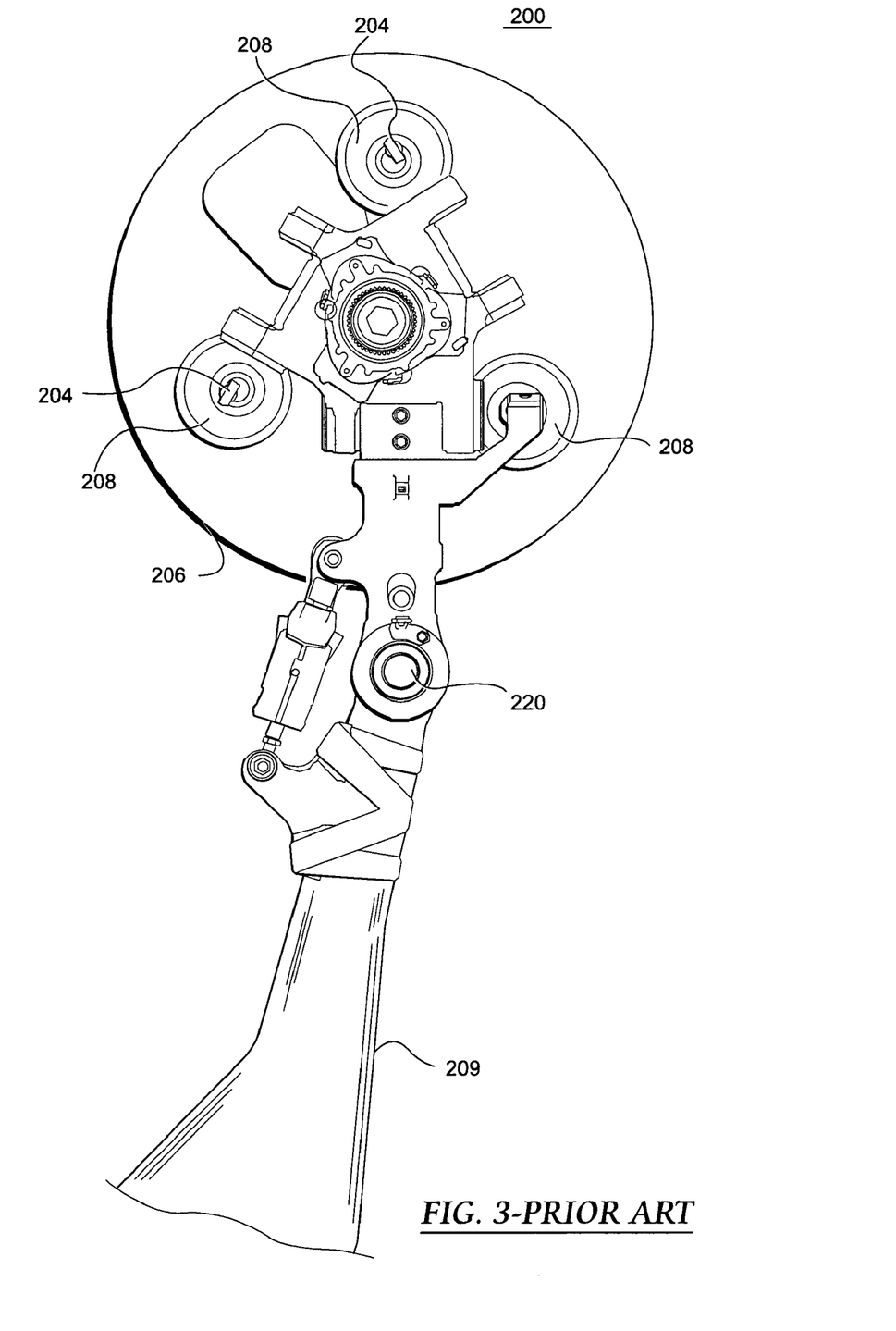
FIG. 3 is a top view of a portion of a prior art helicopter with the blade aligned with its pitch axis.

The pitch links of most helicopters include length adjusters that are centrally located between the ends of the pitch links. These length adjusters can be manipulated to ensure that all of the pitch links on the helicopter are of equal length, which results in proper in-flight operation, reduces vibrations, and enhances rotor performance. Some prior art helicopters include shields, guards, covers, or other equipment that protect the upper control mechanism from rain, snow, and other weather elements. FIG. 2 is a schematic partial cross sectional view of a prior art helicopter 200 having an upper control mechanism 202, a pitch link assembly 204, a canopy 206, and a protective boot 208; FIG. 3 is a top view of a portion of helicopter 200, showing only one blade 209 attached to the rotor. As shown in FIG. 3, helicopter 200 accommodates three blades and three respective pitch link assemblies 204 protruding through canopy 206. Canopy 206 is a rigid cover that extends over upper control mechanism 202, thus protecting upper control mechanism 202 from the elements. Canopy 206 includes holes formed therein; pitch link assembly 204 protrudes through one of these holes. Protective boot 208 encircles pitch link assembly 204 and spans the space between pitch link assembly 204 and canopy 206. In other words, protective boot 208 fills the gap created by the hole that receives the pitch link assembly 204.

Protective boot 208 is formed from a flexible material that enables upper control mechanism 202 to raise and lower pitch link assembly 204 without breaking the weather "seal." In FIG. 2, protective boot 208 has a lower section 210 that resembles an accordion and an upper section 212 that resembles a sleeve. Lower section 210 is secured to the center of pitch link assembly 204 using string or laces 214, while upper section 212 is secured near the upper end of pitch link assembly 204 using string or laces 216. These laces 216 are concentrated about the upper end of the tube-shaped portion of protective boot 208. As depicted in FIG. 2, upper section 212 of protective boot 208 covers most of the portion of pitch link assembly 204 located above canopy 206.

Pitch link assembly 204 includes an adjustment mechanism 218 that is located under canopy 206 and, consequently, under protective boot 208. Adjustment mechanism 218 is rotated (using a wrench or other tool) in one direction to lengthen pitch link assembly 204, and is rotated in the opposite direction to shorten pitch link assembly 204. To adjust the length of pitch link assembly 204, protective boot 208 must be untied, removed, or disassembled to provide access to the hole formed in canopy 206. When upper control mechanism 202 is in the neutral position (as shown in FIG. 2), however, adjustment mechanism 218 is difficult to access from above canopy 206. Upper control mechanism 202 can be positioned such that adjustment mechanism 218 can be better accessed from above canopy 206, however, such raised positioning can create high moments and forces at the hinge points of the blade connected to pitch link assembly 204, for example, at the vertical hinge pin 220 (see FIG. 3). Such high moments can damage internal parts of the link assembly during adjustment and, therefore, the blade must be lifted or otherwise supported to alleviate the force at the hinge points. This technique can be cumbersome to practice and time consuming to complete. Alternatively, pitch link assembly 204 can be completely removed from helicopter 200 (after installing a pitch lock pin) so that it can be easily adjusted by itself. After adjustment, pitch link assembly 204 must be reinstalled on helicopter 200. Of course, this can add significant time to the adjustment procedure, particularly when several pitch link assemblies need adjustment and/or when many iterative adjustments are needed for a single pitch link assembly.

Accordingly, it is desirable to have a helicopter pitch link assembly that can be easily adjusted while installed on a helicopter having a protective canopy and/or a protective boot surrounding the pitch link assembly. Furthermore, other desirable features and characteristics of the present invention will become apparent from the subsequent detailed description and the appended claims, taken in conjunction with the accompanying drawings and the foregoing technical field and background.

BRIEF SUMMARY

A pitch link assembly as described in more detail herein enables relatively quick and easy length adjustment while the pitch link assembly is installed on a helicopter. When deployed on a helicopter having a protective canopy and/or a protective pitch link boot, the pitch link assembly can be accessed from above the canopy and without having to remove or destroy the protective boot. Moreover, a technician can easily adjust the pitch link assembly without having to raise the pitch link assembly into a non-neutral position, thus making it easier to perform the adjustment procedure while avoiding pitch link damage. In practice, use of the pitch link assembly can save numerous man hours in completing repetitive adjustments and protective boot maintenance.

The above and other aspects of the invention may be carried out in one form by a helicopter blade pitch link assembly having a first link member having a first end configured to be coupled to a pitch control mechanism for the helicopter, a protective boot interface feature located on the first link member, a second link member coupled to the first link member, the second link member having a first end configured to be coupled to a rotor blade for the helicopter, the first link member and the second link member defining a length for the helicopter blade pitch link assembly, and an adjustment mechanism coupled to the first link member and to the second link member. The adjustment mechanism is configured to adjust the length, and the protective boot interface feature is located between the adjustment mechanism and the first end of the first link member.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

For the sake of brevity, conventional aspects and features of helicopters and helicopter control systems may not be described in detail herein. Furthermore, the example embodiments of the invention described herein may be deployed in helicopters having designs that differ from that shown in the figures. In this regard, the inventive concepts can be implemented in the context of different practical helicopter designs, and the particular helicopter assemblies shown and described herein are not intended to limit the scope or applicability of the invention in any way.

The following description may refer to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically.

The following description may use descriptive terms such as "upper" and "lower" to refer to the relative positioning of elements or features. Unless otherwise noted, the use of such terms is not intended to limit the scope or application of the invention. Rather, such terms may be used for consistency with the figures and for ease of description.

Figure 4:
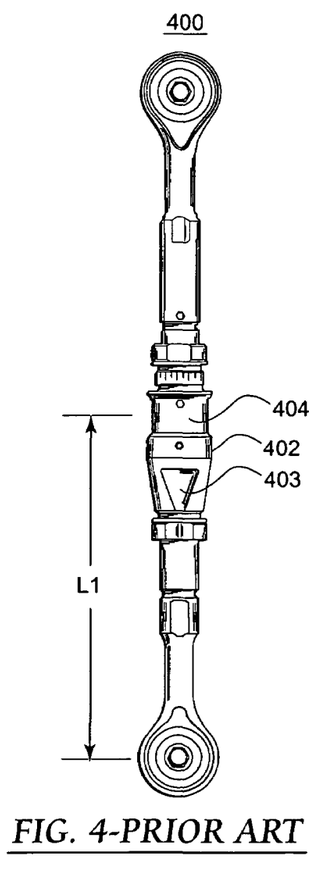
FIG. 4 is a plan view of a prior art pitch link assembly.
Figure 5:
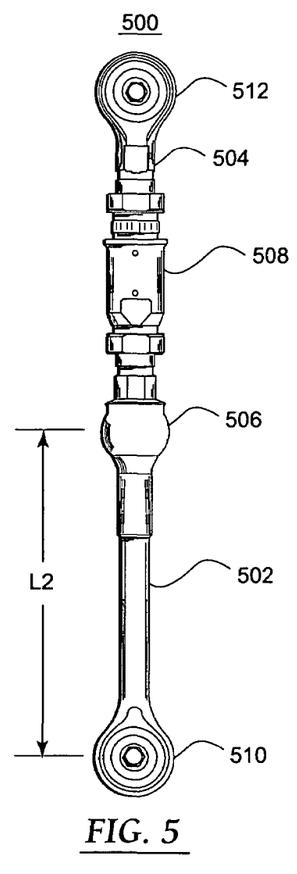
FIG. 5 is a plan view of a pitch link assembly according to a first example embodiment of the invention.
Figure 6:
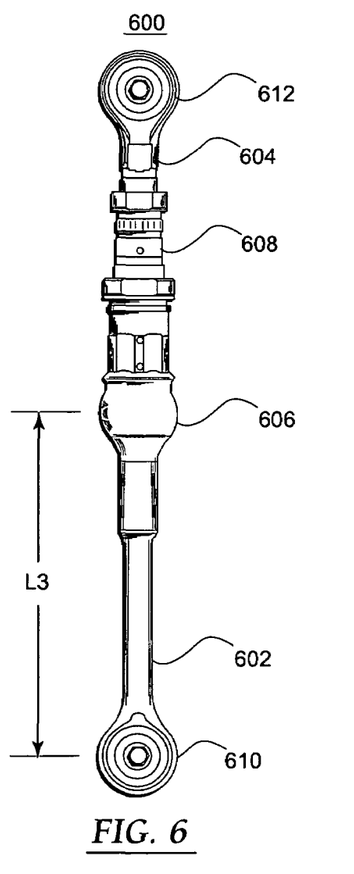
FIG. 6 is a plan view of a pitch link assembly according to a second example embodiment of the invention.
Figure 7:
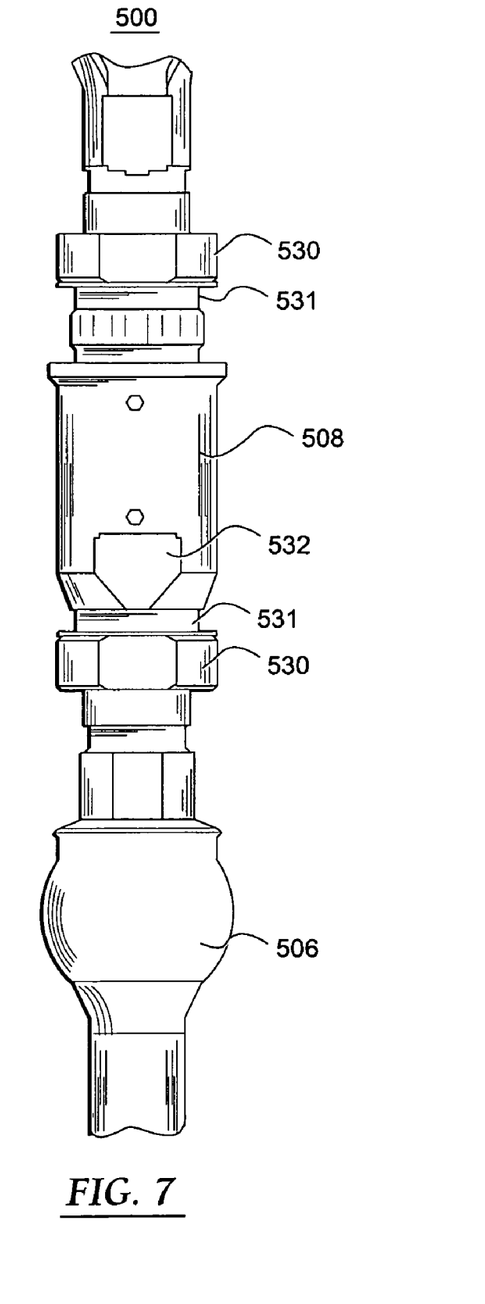
FIG. 7 is a plan view of a portion of the pitch link assembly shown in FIG. 5.

FIG. 4 is a plan view of a prior art pitch link assembly 400, FIG. 5 is a plan view of a pitch link assembly 500 configured in accordance with a first example embodiment of the invention, and FIG. 6 is a plan view of a pitch link assembly 600 configured in accordance with a second example embodiment of the invention. Pitch link assemblies 500/600 represent an improvement over pitch link assembly 400 in that they eliminate steps currently required during pitch link adjustment and protective boot maintenance. In practice, use of pitch link assemblies 500/600 can save many man hours related to repetitive adjustment associated with blade tracking. In pitch link assembly 500/600, the components used for pitch link length adjustment are located near the upper end of the assembly, which provides access to wrench flats and the length adjustment mechanism from above the protective canopy, while the rotor controls are set at a neutral position (such that the lag pin remains vertical). With the lag pin in a vertical position, the rotor blade is balanced about its pitch axis. Consequently, little effort is needed to move the adjustment mechanism to track the rotor blade. This condition will reduce the likelihood of damage to pitch link assembly 500/600 during tracking adjustment. This condition will also eliminate the need to physically lift the blade during pitch link adjustment. Moreover, with the adjustment mechanism located near the top of pitch link assembly 500/600, the weather protective boot can be mounted below the adjustment mechanism. This mounting position eliminates the need to disconnect and reconnect the protective boot during adjustment of pitch link assembly 500/600. In addition, the protective boot can be replaced in the field by simply removing the old boot without having to disconnect pitch link assembly 500/600.

Referring to FIG. 4, prior art pitch link assembly 400 includes a length adjustment mechanism 402 that is located near the center of its length. Specifically, the distance identified as "L1" in FIG. 4 is 9.62 inches. Adjustment mechanism 402 includes wrench flats 403 sized to fit a wrench or other adjustment tool. Adjustment mechanism 402 is a turnbuckle that is rotated to increase or decrease the overall length of pitch link assembly 400. Adjustment mechanism 402 includes a boot mounting surface 404 that is formed as a cylindrical recess around the top of adjustment mechanism 402. Boot mounting surface 404 is shaped to receive the protective boot, which can be secured to boot mounting surface 404 using tie down laces. In this regard, FIG. 2 shows laces 214 securing protective boot 208 around the boot mounting surface of pitch link assembly 204. These laces 214 are concentrated about the lower end of the tube-shaped portion of the protective boot 208. When installed, adjustment mechanism 402 is covered by the protective boot and adjustment mechanism 402 is located under the protective canopy.

Referring to FIGS. 5 and 7-10, pitch link assembly 500 generally includes a first or lower link member 502, a second or upper link member 504 coupled to lower link member 502, a protective boot interface feature 506, and an adjustment mechanism 508. Lower link member 502, upper link member 504, and adjustment mechanism 508 are formed from a rigid and strong material, such as stainless steel or titanium alloy. Lower link member 502 has a first or lower end 510, which is suitably configured to be coupled to a pitch control mechanism for the helicopter (not shown in FIG. 5). For example, end 510 may be coupled to the upper control mechanism of the helicopter, as depicted in FIG. 1 or FIG. 2. Moreover, end 510 may be coupled to a swash plate of the helicopter, which tilts to vary the angle of the rotor disc plane, which results in forward/reverse propulsion. End 510 can be coupled to the upper control mechanism using known devices, couplers, bearings, or joints, such as a spherical bearing or a gimbal mechanism and through bolts. Similarly, upper link member 504 has a first or upper end 512, which is suitably configured to be coupled to a rotor head assembly and blade for the helicopter (not shown in FIG. 5). For example, end 512 may be coupled to a pitch arm, a bracket, or other feature of the rotor head and blade, as depicted in FIG. 1 or FIG. 3. End 512 can be coupled to the rotor head and blade using known devices, couplers, bearings, or joints, such as a spherical bearing or gimbal mechanism and through bolts. When assembled, upper link member 504 and lower link member 502 combine to define an overall length for pitch link assembly 500. This overall length can be increased or decreased via adjustment mechanism 508.

Protective boot interface feature 506 is located on lower link member 502. In this example embodiment, protective boot interface feature 506 is located in a fixed position relative to end 510. In one practical embodiment, the distance identified as "L2" in FIG. 5 is 9.18 inches. This distance generally corresponds to the fixed length between the mounting hole for lower link member 502 and the center of protective boot interface feature 506. Notably, the distance L2 is approximately equal to the distance L1 in prior art pitch link assembly 400.

Figure 8:
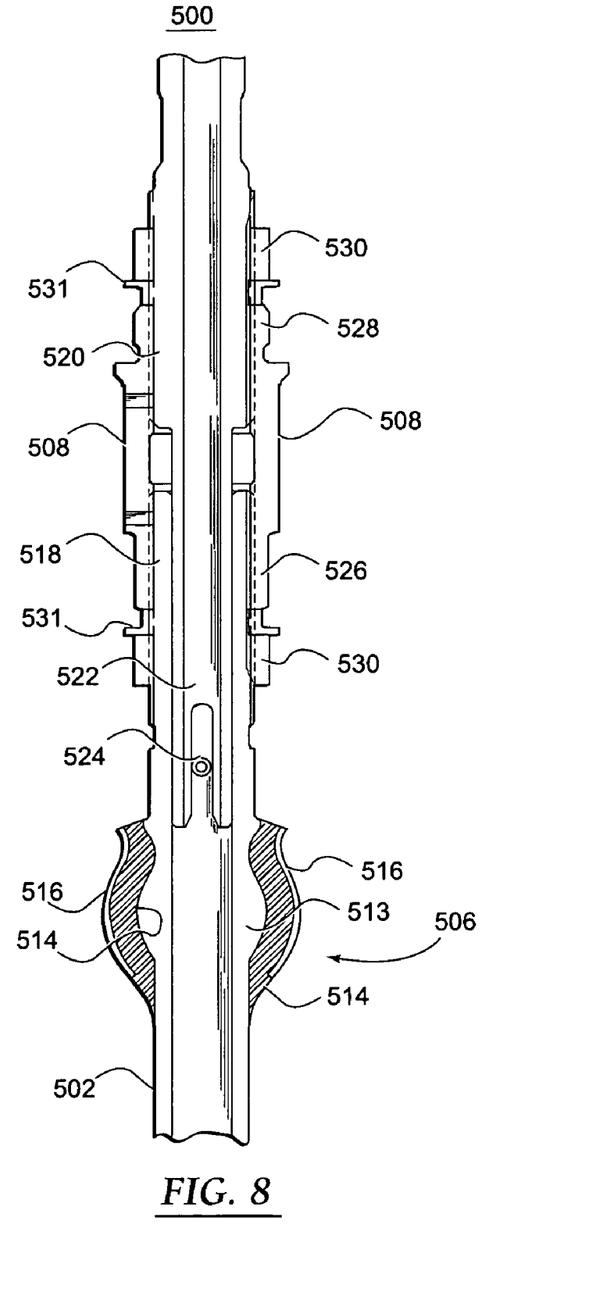
FIG. 8 is a cross sectional view of the pitch link assembly shown in FIG. 7.

Protective boot interface feature 506 is suitably configured to maintain the protective boot on lower link member 502. In one practical embodiment, protective boot interface feature 506 includes a bulb-shaped protrusion around lower link member 502, as depicted in FIG. 5. Moreover, protective boot interface feature 506 may be integrally formed in lower link member 502 via machining, bonding, welding, or the like. FIG. 8, which is a cross sectional view of a portion of pitch link assembly 500, depicts one example embodiment of protective boot interface feature 506. In this embodiment, protective boot interface feature 506 includes a protrusion 513 located on lower link member 502, resilient material 514, and a rigid outer shell 516. Protrusion 513 resembles a spherical bulge in this example, and protrusion 513 may be integrally machined into the barrel of lower link member 502. The shape of protrusion 513 helps to retain resilient material 514 on lower link member 502.

In the example embodiment, resilient material 514 forms a ring that surrounds lower link member 502. Resilient material 514 has an inner surface that is attached to lower link member 502 via sealant, vulcanization, bonding, adhesive, or the like. In one practical embodiment, resilient material 514 is formed from rubber having a thickness of about 0.25 inch. The shape and composition of resilient material 514 provides a soft and pliable protective boot mount that can seal the protective boot around lower link member 502. Resilient material 514 has an outer surface that is attached to the inner surface of rigid outer shell 516. In this manner, rigid outer shell 516 surrounds at least a portion of resilient material 514, as depicted in FIG. 8. In the example embodiment, rigid outer shell 516 has a contoured outer surface that forms a protrusion around lower link member 502. The outer surface of rigid outer shell 516 provides a suitable clamping surface for mounting of the protective boot. In practice, resilient material 514 may follow the general shape of protrusion 513 and rigid outer shell 516 may follow the general shape of resilient material 514. Rigid outer shell 516 may be formed from a stiff and tough material, such as stainless steel, titanium alloy, aluminum alloy, fiberglass composite, or carbon fiber composite, and rigid outer shell 516 may be attached to resilient material 514 via sealant, vulcanization, bonding, adhesive, or the like. As described in more detail below, protective boot interface feature 506 facilitates attachment of the protective boot to pitch link assembly 500 at a single location rather than at multiple locations as required by the design shown in FIG. 2.

Adjustment mechanism 508 is coupled to upper link member 504 and to lower link member 502 in a suitable manner that enables adjustment mechanism 508 to be manipulated to adjust the length of pitch link assembly 500. Notably, protective boot interface feature 506 is located between adjustment mechanism 508 and end 510 of lower link member 502. In particular, all of the components of adjustment mechanism 508 are located above protective boot interface feature 506, as shown in FIG. 5. This configuration allows adjustment mechanism 508 to be exposed above the protective boot and the protective canopy when pitch link assembly 500 is installed on the helicopter, thus facilitating easy adjustment of pitch link assembly 500. In the example embodiment, adjustment mechanism 508 is realized as a turnbuckle that is configured to increase the length of pitch link assembly 500 when rotated in a first direction (e.g., clockwise) and to decrease the length of pitch link assembly 500 when rotated in a second direction (e.g., counterclockwise).

The cross sectional view of FIG. 8 depicts the inner configuration of the turnbuckle employed by pitch link assembly 500. In this example, lower link member 502 has an externally threaded second or upper end 518, and upper link member 504 has an externally threaded second or lower end 520 (the dashed lines in FIG. 8 represent threads). Upper end 518 of lower link member 502 is hollow to receive an extension 522 of lower end 520 of upper link member 504. The tip of extension 522 is forked to enable the tip to engage an alignment pin 524. The engagement of the forked tip and alignment pin 524 ensures that upper link member 504 and lower link member 502 do not rotate about their longitudinal axes relative to each other.

The turnbuckle itself includes a first or lower internally threaded end 526 that is configured to receive the externally threaded end 518 of lower link member 502. The turnbuckle also includes a second or upper internally threaded end 528 that is configured to receive the externally threaded end 520 of upper link member 504. The directions of the threads are selected such that rotation of the turnbuckle in one direction causes lower link member 502 and upper link member 504 to extend outward relative to the turnbuckle (thus increasing the overall length of pitch link assembly 500), while rotation of the turnbuckle in the opposite direction causes lower link member 502 and upper link member 504 to withdraw into the turnbuckle (thus decreasing the overall length of pitch link assembly 500).

As mentioned above, pitch link assembly 500 can be adjusted without having to remove it from the helicopter. Adjustment is accomplished as follows. First, cotter pins (not shown) that secure lock nuts 530 to lock washers 531 are removed. Next, lock nuts 530 are loosened to release the turnbuckle. Then, the turnbuckle can be rotated (in either direction, depending upon the desired adjustment) using a wrench or other tool that engages wrench flats 532 formed on the turnbuckle. After rotation of the turnbuckle, lock nuts 530 are tightened to maintain the turnbuckle in its current position and, therefore, maintain the length of pitch link assembly 500. After lock nuts 530 are tightened, cotters pins are installed to secure lock nuts 530 to lock washers 531.

Figure 9:
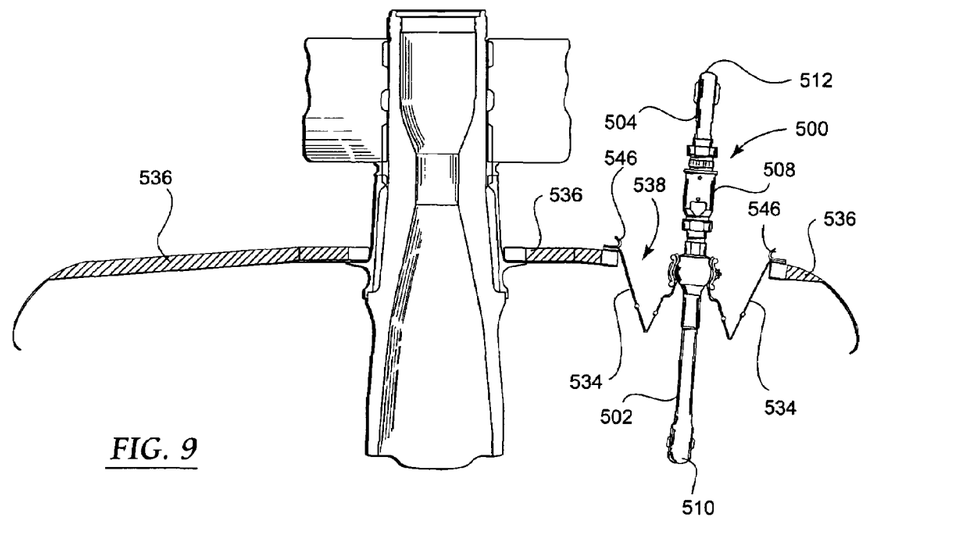
FIG. 9 is a partial cross sectional view of a portion of a helicopter, along with a pitch link assembly of the type shown in FIG. 5.
Figure 10:
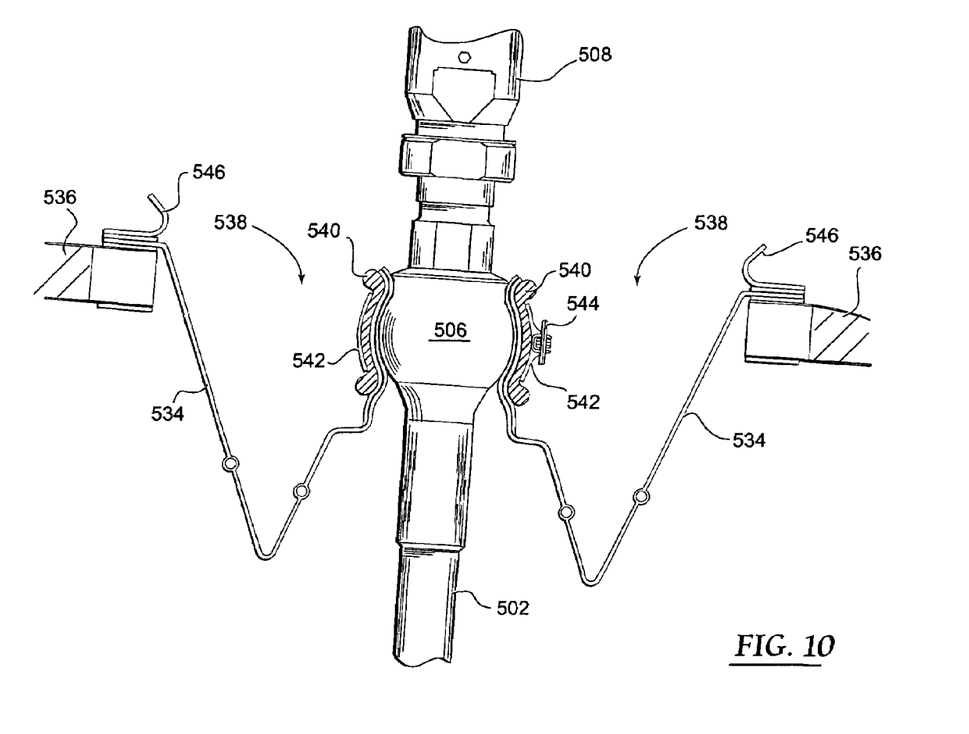
FIG. 10 is a partial cross sectional view of the pitch link assembly, protective boot, and canopy shown in FIG. 9.
Figure 11:
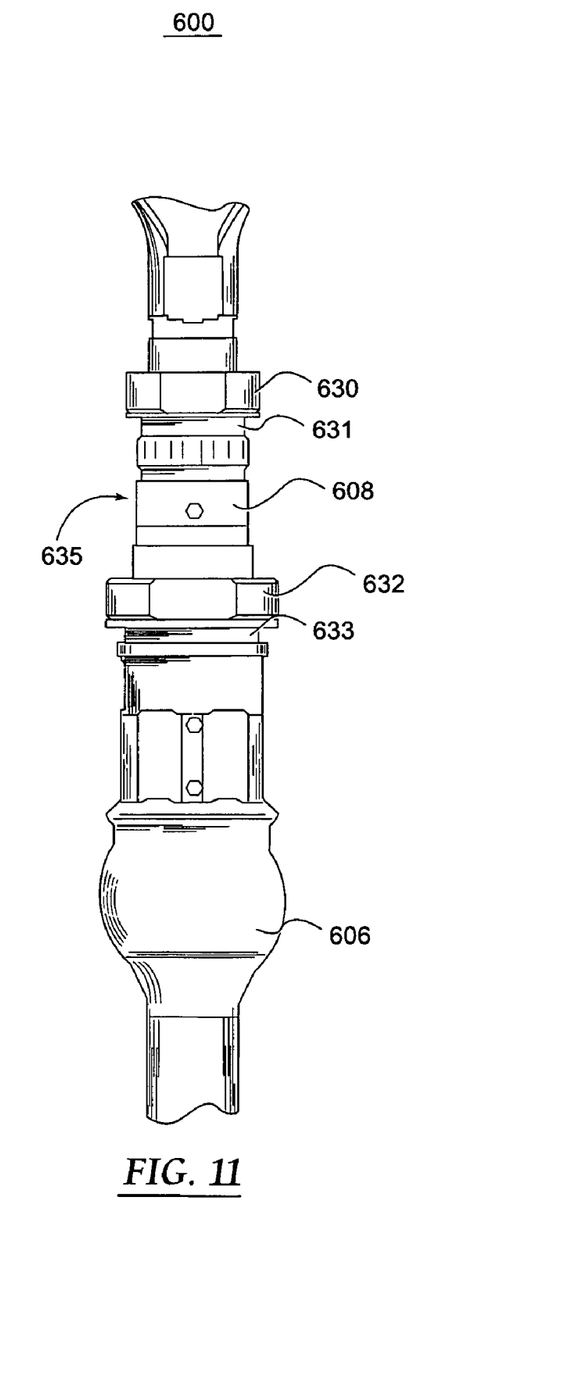
FIG. 11 is a plan view of a portion of the pitch link assembly shown in FIG. 6.

FIG. 9 is a partial cross sectional view of a portion of a helicopter with pitch link assembly 500 installed therein. For clarity, the helicopter blade and pitch control mechanism are not depicted in FIG. 9. This helicopter subassembly includes a protective boot 534 coupled to pitch link assembly 500. More specifically, protective boot 534 is coupled to lower link member 502 at protective boot interface feature 506 (see FIG. 10). Protective boot 534 may be formed from any suitable material that is flexible and resilient, for example, rubber, nylon, or a rubber/nylon composite. In this example, protective boot 534 is double layered at the section that slides over pitch link assembly 500, as shown in FIG. 10. This double layering reinforces protective boot 534 where it is clamped to pitch link assembly 500. FIG. 10 depicts one suitable arrangement for coupling protective boot 534 to protective boot interface feature 506. In this example, protective boot 534 is positioned over pitch link assembly 500 such that the inner "donut" hole of protective boot 534 is located at protective boot interface feature 506. Then, a split collar 540 formed of plastic, composite material, pliable metal, or any suitable material is placed around protective boot 534. As shown in FIG. 10, collar 540 may be contoured to better mate with protective boot interface feature 506. Once collar 540 is in place, a clamp 542 is installed around collar 540. Clamp 542 may include a lever actuator 544, a threaded tightening mechanism, or other securing feature that is configured to secure protective boot 534 around protective boot interface feature 506. In practical embodiments, clamp 542 may be held in position using a cotter pin or any appropriate locking element.

In addition, the helicopter subassembly includes a canopy 536 that is configured to cover the pitch control mechanism for the helicopter. Canopy 536 may be formed from a rigid and weatherproof material such as fiberglass, aluminum, carbon fiber and a NOMEX or aluminum honeycomb core, or the like. Canopy 536 includes a hole 538 formed therein for each pitch link assembly (see FIG. 3). As shown in FIG. 9, hole 538 receives pitch link assembly 500 such that end 510 is located below canopy 536 and such that end 512 is located above canopy 536. Protective boot 534 may also be coupled to canopy 536 such that protective boot 534 spans the space between pitch link assembly 500 and canopy 536. In this example, the outer lip of protective boot 534 overlaps canopy 536, and this outer lip is secured to canopy 536 via a ring element 546 (depicted in cross section in FIG. 9 and FIG. 10) that is clamped, bolted, or otherwise secured to canopy 536. Notably, when pitch link assembly 500 is installed as shown in FIG. 9, adjustment mechanism 508 is completely exposed above canopy 536. Consequently, adjustment mechanism 508 is readily accessible from above canopy 536 and a technician need not remove protective boot 534, canopy 536, or pitch link assembly 500 to make adjustments to pitch link assembly 500.

Pitch link assembly 600 represents another example embodiment of the invention (see FIGS. 6 and 11-13). Pitch link assembly 600 shares a number of features, elements, and functions with pitch link assembly 500, and such common features, elements, and functions will not be redundantly described in connection with pitch link assembly 600. Referring to FIG. 6, pitch link assembly 600 generally includes a first or lower link member 602, a second or upper link member 604 coupled to lower link member 602, a protective boot interface feature 606, and an adjustment mechanism 608. Lower link member 602 has a first or lower end 610, which is suitably configured to be coupled to a pitch control mechanism for the helicopter (not shown in FIG. 6). Upper link member 604 has a first or upper end 612, which is suitably configured to be coupled to a rotor blade for the helicopter (not shown in FIG. 6). The overall length of pitch link assembly 600 can be increased or decreased via adjustment mechanism 608.

Protective boot interface feature 606 is located on lower link member 602. In this example embodiment, protective boot interface feature 606 is located in a fixed position relative to end 610. In one practical embodiment, the distance identified as "L3" in FIG. 6 is 9.73 inches. This distance generally corresponds to the fixed length between the mounting hole for lower link member 602 and the center of protective boot interface feature 606. Notably, the distance L3 is approximately equal to the distance L1 in prior art pitch link assembly 400.

Adjustment mechanism 608 is coupled to upper link member 604 and to lower link member 602 in a suitable manner that enables adjustment mechanism 608 to be manipulated to adjust the length of pitch link assembly 600. Notably, protective boot interface feature 606 is located between adjustment mechanism 608 and end 610 of lower link member 602. In particular, all of the components of adjustment mechanism 608 are located above protective boot interface feature 606, as shown in FIG. 6. This configuration allows adjustment mechanism 608 to be exposed above the protective boot and the protective canopy when pitch link assembly 600 is installed on the helicopter, thus facilitating easy adjustment of pitch link assembly 600. In the example embodiment, adjustment mechanism 608 is realized as a turnbuckle that is configured to increase the length of pitch link assembly 600 when rotated in a first direction (e.g., clockwise) and to decrease the length of pitch link assembly 600 when rotated in a second direction (e.g., counterclockwise).

Figure 12:
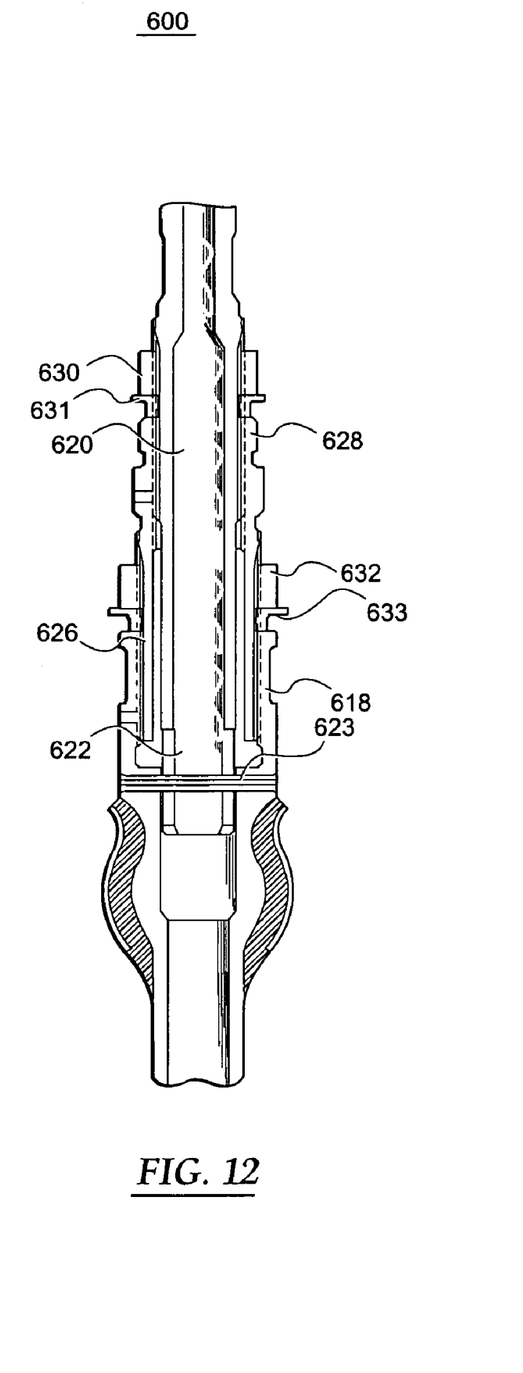
FIG. 12 is a cross sectional view of the pitch link assembly shown in FIG. 11.

The cross sectional view of FIG. 12 depicts the inner configuration of the turnbuckle employed by pitch link assembly 600. In this example, lower link member 602 has an internally threaded second or upper end 618, and upper link member 604 has an externally threaded second or lower end 620 (the dashed lines in FIG. 12 represent threads). Upper end 618 of lower link member 602 is hollow to receive an extension 622 of lower end 620 of upper link member 604. The tip of extension 622 is forked to enable the tip to engage an alignment feature 623. In FIG. 12, alignment feature 623 is depicted in cross section, with one side of the forked extension 622 behind alignment feature 623. The engagement of the forked tip and alignment pin ensures that upper link member 604 and lower link member 602 do not rotate about their longitudinal axes relative to each other.

The turnbuckle itself includes a first or lower externally threaded end 626 that is configured to receive the internally threaded end 618 of lower link member 602. The turnbuckle also includes a second or upper internally threaded end 628 that is configured to receive the externally threaded end 620 of upper link member 604. The directions of the threads are selected such that rotation of the turnbuckle in one direction causes lower link member 602 and upper link member 604 to extend outward relative to the turnbuckle (thus increasing the overall length of pitch link assembly 600), while rotation of the turnbuckle in the opposite direction causes lower link member 602 and upper link member 604 to withdraw into the turnbuckle (thus decreasing the overall length of pitch link assembly 600).

As mentioned above, pitch link assembly 600 can be adjusted without having to remove it from the helicopter. Adjustment is accomplished as follows. First, cotter pins (not shown) that secure lock nuts 630/632 to lock washers 631/633 are removed. Next, lock nuts 630/632 are loosened to release the turnbuckle. Then, the turnbuckle can be rotated (in either direction, depending upon the desired adjustment) using a wrench or other tool that engages wrench flats formed on the turnbuckle. Due to the perspective of FIG. 11 and FIG. 12, the wrench flats on the turnbuckle are not distinguishable. These wrench flats, however, may be located on a section 635 of the turnbuckle. After rotation of the turnbuckle, lock nuts 630/632 are tightened and secured to lock washers 631/632 to maintain the turnbuckle in its current position and, therefore, maintaining the length of pitch link assembly 600.

Figure 13:
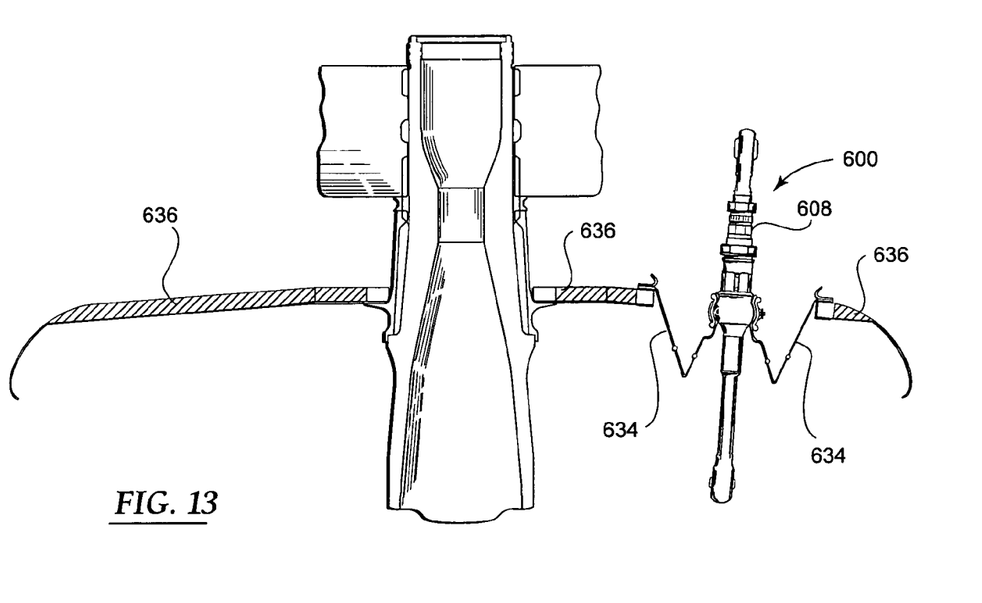
FIG. 13 is a partial cross sectional view of a portion of a helicopter, along with a pitch link assembly of the type shown in FIG. 6.

FIG. 13 is a partial cross sectional view of a portion of a helicopter with pitch link assembly 600 installed therein. For clarity, the helicopter blade and pitch control mechanism are not depicted in FIG. 13. As described above in connection with FIG. 9, this helicopter subassembly includes a protective boot 634 coupled to pitch link assembly 600 and a canopy 636, where protective boot 634 is also coupled to canopy 636. When pitch link assembly 600 is installed as shown in FIG. 13, adjustment mechanism 608 is completely exposed above canopy 636. Consequently, adjustment mechanism 608 is readily accessible from above canopy 636 and a technician need not remove protective boot 634, canopy 636, or pitch link assembly 600 to make adjustments to pitch link assembly 600.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A helicopter blade pitch link assembly comprising:
   a first link member having a first end configured to be coupled to a pitch control mechanism for the helicopter;
   a protective boot interface feature located on said first link member;
   a second link member coupled to said first link member, said second link member having a first end configured to be coupled to a rotor blade for the helicopter, said first link member and said second link member defining a length for the helicopter blade pitch link assembly; and
   an adjustment mechanism coupled to said first link member and to said second link member, said adjustment mechanism being configured to adjust said length, and said protective boot interface feature being located between said adjustment mechanism and said first end of said first link member.

2. A helicopter blade pitch link assembly according to claim 1, said protective boot interface feature being located in a fixed position relative to said first end of said first link member.

3. A helicopter blade pitch link assembly according to claim 1, said protective boot interface feature comprising a bulb-shaped protrusion around said first link member.

4. A helicopter blade pitch link assembly according to claim 1, said protective boot interface feature comprising:
   a resilient material surrounding said first link member, said resilient material having an inner surface attached to said first link member, and having an outer surface; and
   a rigid outer shell surrounding said resilient material, said rigid outer shell having an inner surface attached to said outer surface of said resilient material, and having a contoured outer surface that forms a protrusion around said first link member.

5. A helicopter blade pitch link assembly according to claim 1, said adjustment mechanism comprising a turnbuckle configured to increase said length when rotated in a first direction and to decrease said length when rotated in a second direction.

6. A helicopter blade pitch link assembly according to claim 5, wherein:
   said first link member has an externally threaded second end;
   said second link member has an externally threaded second end; and
   said turnbuckle comprises a first internally threaded end configured to receive said externally threaded second end of said first link member, and a second internally threaded end configured to receive said externally threaded second end of said second link member.

7. A helicopter blade pitch link assembly according to claim 5, wherein:
   said first link member has an internally threaded second end;
   said second link member has an externally threaded second end; and
   said turnbuckle comprises a first externally threaded end configured to receive said internally threaded second end of said first link member, and a second internally threaded end configured to receive said externally threaded second end of said second link member.

8. A helicopter blade pitch link assembly comprising:
   a first link member having a first end configured to be coupled to a pitch control mechanism for the helicopter;
   a second link member coupled to said first link member, said second link member having a first end configured to be coupled to a rotor blade for the helicopter, said first link member and said second link member defining a length for the helicopter blade pitch link assembly;
   an adjustment mechanism coupled to said first link member and to said second link member, said adjustment mechanism being configured to adjust said length; and
   a protective boot coupled to said first link member at a location between said adjustment mechanism and said first end of said first link member.

9. A helicopter blade pitch link assembly according to claim 8, further comprising a protective boot interface feature at said location on said first link member, said protective boot interface feature being configured to maintain said protective boot on said first link member.

10. A helicopter blade pitch link assembly according to claim 9, said protective boot interface feature being located in a fixed position relative to said first end of said first link member.

11. A helicopter blade pitch link assembly according to claim 9, said protective boot interface feature being integrally formed in said first link member.

12. A helicopter blade pitch link assembly according to claim 8, said adjustment mechanism comprising a turnbuckle configured to increase said length when rotated in a first direction and to decrease said length when rotated in a second direction.

13. A helicopter blade pitch link assembly according to claim 8, wherein:
   said first link member has an externally threaded second end;
   said second link member has an externally threaded second end; and
   said turnbuckle comprises a first internally threaded end configured to receive said externally threaded second end of said first link member, and a second internally threaded end configured to receive said externally threaded second end of said second link member.

14. A helicopter blade pitch link assembly according to claim 8, wherein:

said first link member has an internally threaded second end;

said second link member has an externally threaded second end; and said turnbuckle comprises a first externally threaded end configured to receive said internally threaded second end of said first link member, and a second internally threaded end configured to receive said externally threaded second end of said second link member.

15. A helicopter assembly comprising:
a pitch link assembly comprising:
  a first end configured to be coupled to a pitch control mechanism for the helicopter;
  a second end configured to be coupled to a rotor blade for the helicopter, said first end and said second end defining a length for said pitch link assembly; and
  an adjustment mechanism located between said first end and said second end, said adjustment mechanism being configured to adjust said length;
a canopy configured to cover the pitch control mechanism for the helicopter, said canopy comprising a hole formed therein that receives said pitch link assembly, said first end being located below said canopy, and said second end being located above said canopy; and
a protective boot coupled to said canopy, and coupled to said pitch link assembly at a location between said adjustment mechanism and said first end, said protective boot spanning space between said pitch link assembly and said canopy.

16. A helicopter assembly according to claim 15, further comprising a protective boot interface feature at said location on said pitch link assembly, said protective boot interface feature being configured to maintain said protective boot on said pitch link assembly.

17. A helicopter assembly according to claim 16, said protective boot interface feature being located in a fixed position relative to said first end.

18. A helicopter assembly according to claim 16, said protective boot interface feature comprising a bulb-shaped protrusion around said pitch link assembly.

19. A helicopter assembly according to claim 15, said adjustment mechanism comprising a turnbuckle configured to increase said length when rotated in a first direction and to decrease said length when rotated in a second direction.

20. A helicopter assembly according to claim 15, said adjustment mechanism being completely exposed above said canopy.

21. A helicopter blade pitch link assembly comprising:
a link member configured to be coupled between a pitch control mechanism for the helicopter and a rotor blade for the helicopter; and
a protective boot interface feature located on said link member, said protective boot interface feature comprising:
  a resilient material surrounding said link member, said resilient material having an inner surface attached to said link member, and having an outer surface; and
  a rigid outer shell surrounding said resilient material, said rigid outer shell having an inner surface attached to said outer surface of said resilient material, and having a contoured outer surface that forms a protrusion around said link member.

22. A helicopter blade pitch link assembly according to claim 21, said protective boot interface feature being located in a fixed position on said link member.

23. A helicopter blade pitch link assembly according to claim 21, said protective boot interface feature comprising a protrusion located on said link member, said resilient material surrounding said protrusion.

24. A helicopter blade pitch link assembly according to claim 23, said protrusion being integrally formed on said link member.

* * * * *